No. 828,116. PATENTED AUG. 7, 1906.
O. HOFFMANN.
POWER TRANSMITTING DEVICE.
APPLICATION FILED JAN. 2, 1906.

2 SHEETS—SHEET 1.

INVENTOR
OTTO HOFFMANN
BY
Paul & Paul
HIS ATTORNEYS

WITNESSES

No. 828,116. PATENTED AUG. 7, 1906.
O. HOFFMANN.
POWER TRANSMITTING DEVICE.
APPLICATION FILED JAN. 2, 1906.
2 SHEETS—SHEET 2.
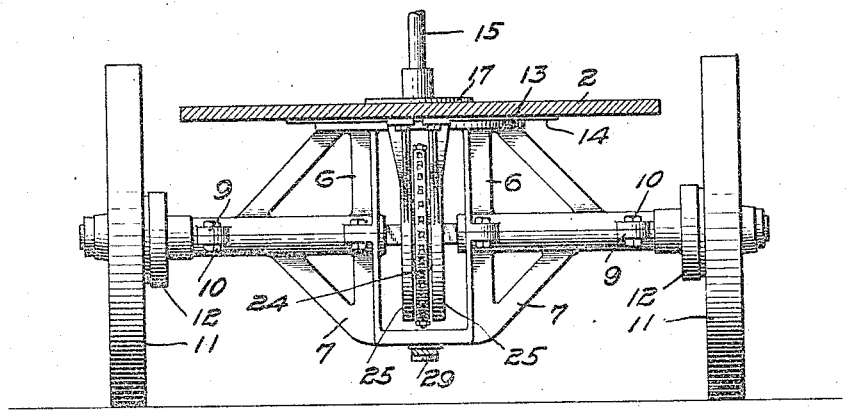
FIG. 2.
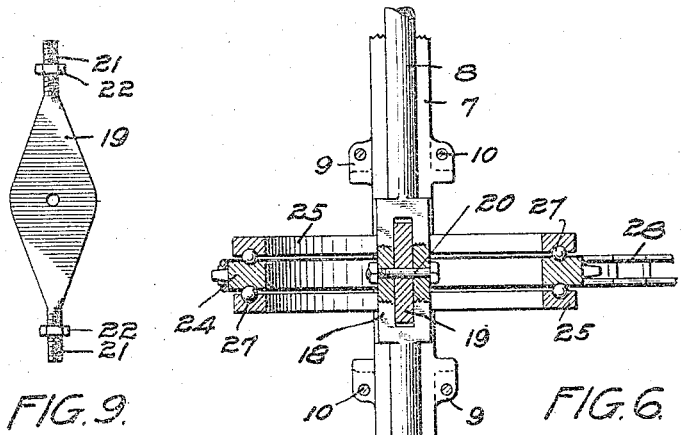
FIG. 9.  FIG. 6.
FIG. 7.  FIG. 8.
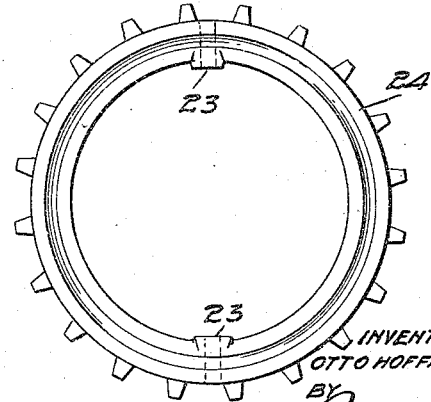
WITNESSES
INVENTOR
OTTO HOFFMANN
BY
HIS ATTORNEYS

UNITED STATES PATENT OFFICE.

OTTO HOFFMANN, OF GRANITE, MINNESOTA.

POWER-TRANSMITTING DEVICE.

No. 828,116.  Specification of Letters Patent.  Patented Aug. 7, 1906.

Application filed January 2, 1906. Serial No. 294,148.

*To all whom it may concern:*

Be it known that I, OTTO HOFFMANN, of Granite, Morris county, State of Minnesota, have invented certain new and useful Improvements in Power-Transmitting Devices, of which the following is a specification.

My invention relates to means for transmitting power from the rear to the forward axle of a vehicle, such as an automobile; and the object of my invention is to provide means in connection with the forward axle for transmitting power thereto which will also permit the oscillation of the axle for steering purposes.

My invention consists generally in providing a driven gear having a swiveled or universal-joint connection with the forward axle.

Further, the invention consists in various constructions and combinations, all as hereinafter described, and particularly pointed out in the claims.

Figure 1:
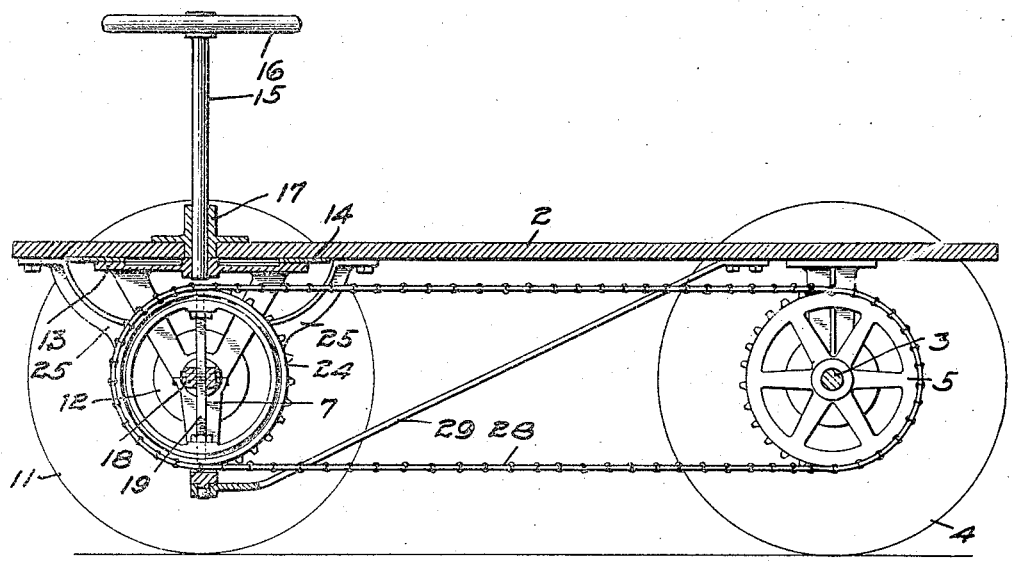
Figure 3:
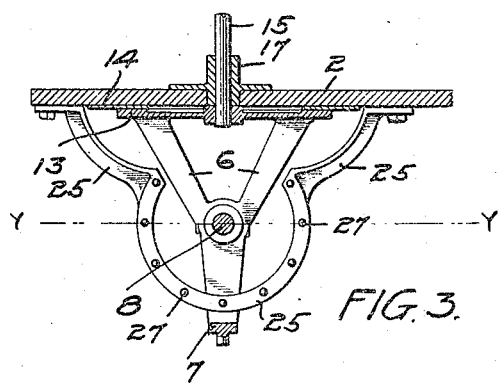
Figure 5:
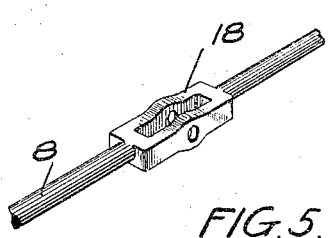
Figure 4:
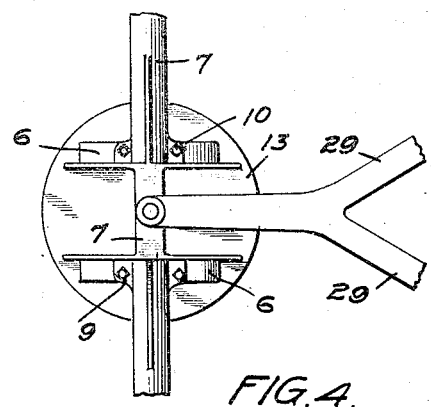

In the accompanying drawings, forming part of this specification, Figure 1 is a longitudinal vertical section of a vehicle with my invention applied thereto. Fig. 2 is a transverse sectional view of the same. Fig. 3 is a detail sectional view showing the manner of mounting the steering-post and its position with respect to the axle. Fig. 4 is a bottom view of the apparatus. Fig. 5 is a detail perspective view of the middle portion of the axle. Fig. 6 is a sectional view on the line *y y* of Fig. 3. Fig. 7 is a detail sectional view illustrating the manner of mounting the driven sprocket on the forward axle. Fig. 8 is a detail view of the sprocket, and Fig. 9 is a similar view of the spoke or connection between the sprocket and the axle.

In the drawings, 2 represents the floor of a vehicle having a rear axle 3 and carrying-wheels 4 and a sprocket 5 secured on said axle and driven from any suitable source of power (not shown) carried by the vehicle. At the forward end of the vehicle-body I provide castings 6 and 7, arranged in pairs above and below the axle 8 and having lugs or ears 9, secured together by bolts 10. Carrying-wheels 11 are mounted on the said axle and have ratchet connections 12 therewith, as usual in running-gears where it is desirable to operate one wheel without affecting the other, as in making a turn. The castings or frame 6 have a circular or upper portion 13, similar to a fifth-wheel and adapted to slide on a ring 14, secured to the under side of the bottom or plate 2. A steering-post 15, having a wheel 16, is inserted into a suitable bushing 17 in the bottom 2 and secured in the top of the frame 6, so that the movement of said operating-wheel will be transmitted to the forward axle. The axle 8 is provided with a centrally-arranged loop 18, in which a flattened spoke 19 is pivoted by means of a bolt 20, which extends through the sides of said loop and through said spoke, as shown in Fig. 6. The loop is of sufficient length to allow the spoke to oscillate on its pivot back and forth toward the ends of the axle. The spoke terminates at each end in threaded shanks 21, having nuts 22 and adapted to fit into sockets 23, provided in a sprocket-wheel 24, which is loosely mounted on the axle between depending guides 25. These guides are secured to the under side of the vehicle bottom or body and have annular grooves 26, between which and the corresponding grooves in the sprocket-wheel bearing-balls 27 are arranged. These balls allow the sprocket-wheel to revolve with the axle between the guides 25. If in steering the vehicle the spoke 19 happens to stand vertically, then the oscillation of the axle will be on the pivots at the ends of the spoke. If the spoke is horizontal, then it will oscillate on its center bearing and no movement will take place at its ends. The connection thus serves as a universal joint between the driven sprocket and the axle, allowing the axle to be oscillated back and forth to steer the vehicle and accommodate itself to the rough or uneven surface over which the wheels may be passing. The sprocket-wheel 24 is preferably connected with the wheel 5 by a chain belt 28. It will be obvious, however, that a gear connection may be employed in place of the chain, if preferred.

I also prefer to provide a reach 29, connecting the frame 7 with the bottom 2 of the vehicle.

I do not wish in this application to be confined to the particular means employed for supporting the forward end of the vehicle upon the axle, my invention consisting, essentially, in the means for transmitting power to the center of the oscillating axle, said means permitting the axle to be swung back and forth to steer the vehicle.

I claim as my invention—

1. The combination with a vehicle-axle having carrying-wheels, of a spoke or plate centrally pivoted on said axle, a sprocket-wheel loosely mounted on said axle and having a swiveled connection with the ends of said spoke, and a driving connection for said sprocket-wheel, substantially as described.

2. The combination with an axle having carrying-wheels and provided with a centrally-arranged loop, of a flattened spoke centrally pivoted in said loop, a sprocket-wheel mounted on said axle and having swiveled connections with the ends of said spoke, and said swiveled connections being at right angles substantially with the pivot of said spoke in said loop, and a driving connection for said sprocket-wheel, substantially as described.

3. The combination with a forward axle having carrying-wheels and a frame with a steering-post, of a vehicle-body swiveled on said frame, a sprocket-wheel loosely mounted on said axle, means pivoted on said axle and having a swiveled connection with the rim of said wheel.

4. The combination with the forward axle having carrying-wheels, of a frame mounted on said axle, a steering-post for said frame, a vehicle-bottom supported on said frame, guides depending from said vehicle-bottom, a sprocket-wheel having ball-bearings in said guides, and a spoke centrally pivoted on said axle and having swiveled connections at its ends with said sprocket-wheel, substantially as described.

5. The combination, with an axle having carrying-wheels, of a member centrally pivoted on said axle, a wheel loosely mounted and having a swiveled connection with the ends of said member and a driving connection for said wheel.

In witness whereof I have hereunto set my hand this 29th day of December, 1905.

OTTO HOFFMANN.

Witnesses:
RICHARD PAUL
C. MACNAMARA.